United States Patent
Patterson

[15] 3,668,120
[45] June 6, 1972

[54] TREATMENT OF ORGANIC WASTE PRODUCTS

[72] Inventor: Wayne A. Patterson, 4932 N.W. 31st Street, Oklahoma City, Okla. 73122

[22] Filed: Apr. 22, 1971

[21] Appl. No.: 136,435

[52] U.S. Cl. ........................................210/60, 23/2, 110/8, 203/100, 210/61, 210/63, 210/71
[51] Int. Cl. ........................................C02c 5/04
[58] Field of Search ........................210/12, 63, 71, 60, 61; 203/100 DC; 110/8; 23/2

[56] References Cited

UNITED STATES PATENTS

| | | | |
|---|---|---|---|
| 3,306,236 | 2/1967 | Campbell | 110/8 R |
| 3,527,178 | 9/1970 | Southwick | 110/8 E |
| 2,976,224 | 3/1961 | Gilliland | 203/100 DC |

*Primary Examiner*—Michael Rogers
*Attorney*—Dunlap, Laney, Hessin & Dougherty

[57] ABSTRACT

A process for the treatment of human organic waste products or the like whereby harmless inoffensive gases are produced. In the process, the organic waste products are combined with water to form a fine particle slurry. The slurry is introduced below the surface of a body of suitable molten metal contained in a primary combustion vessel to produce carbon dioxide, water vapor and other gases. The carbon dioxide, water vapor and other gases are introduced into a heated secondary combustion vessel to further oxidize the gases and produce harmless, inoffensive gases which may be vented to the atmosphere.

9 Claims, 3 Drawing Figures

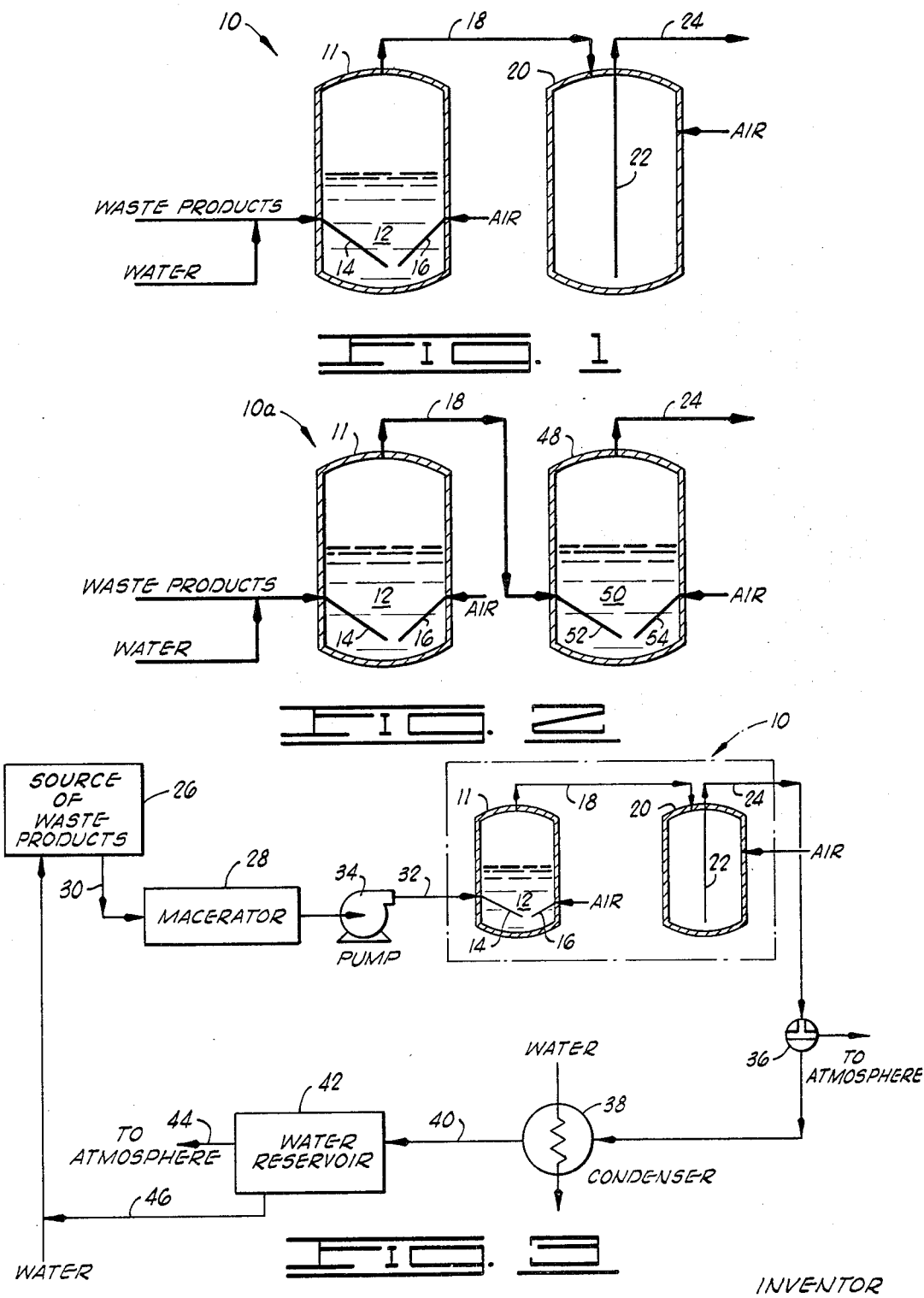

TREATMENT OF ORGANIC WASTE PRODUCTS

BACKGROUND OF THE INVENTION

1. Field of the Invention

This invention relates to a process for converting human waste products or the like into harmless inoffensive gases.

2. Description of the Prior Art

Many attempts have been made in the past to treat human waste products and the like before returning these products to the environment. Most of the commonly accepted processes presently used involve the addition of various chemical compounds to the waste products to react with and to form other compounds which are not considered to be pollutants to the environment. Generally these processes are dependent upon the operator to add the necessary chemicals and therefore are subject to neglect resulting in the discharge of pollutants.

Another common method of disposing of organic waste products is to combine these products with water and spray the resulting slurry in a fine mist into a combustion chamber through a nozzle device where the waste products are oxidized. A disadvantage inherent in this method is that particles of waste material tend to stop up the nozzle device at frequent intervals requiring the process to be stopped while the nozzle device is disassembled and cleaned to remove the offending particles. Another disadvantage exhibited by this method is that waste product particles may be passed through the combustion chamber before the chamber has reached a temperature high enough to assure adequate oxidation of the waste products.

In certain applications, it is not convenient or economical to provide large storage reservoirs to contain waste products. One such application is on board a vessel in waters where overboard discharge of waste products in an untreated state is prohibited. Another such application is at a temporary construction site where construction of large permanent waste treatment facilities is not feasible. Yet another such application is in extremely low temperature climates where soil and streams are frozen to depths which prevent the utilization of common sewage disposal methods.

SUMMARY OF THE INVENTION

The present invention is directed to a process for converting human organic waste products or the like into harmless inoffensive gases wherein the waste products are combined with a quantity of water to form a slurry comprised of water and fine particles of waste products. The slurry is introduced below the surface of a body of molten metal so that carbon dioxide, water vapor and other gases are formed therefrom. The carbon dioxide, water vapor and other gases are then removed from the body of molten metal.

It is, therefore, an object of the present invention to provide a process for the conversion of human waste products or the like into harmless inoffensive gases.

Another object of the present invention is to provide a process for the conversion of human waste products or the like into harmless inoffensive gases which process is suitable for use aboard a vessel, at temporary locations or in extremely low temperature climates.

A further object of the present invention is to provide a process for the conversion of human waste products or the like into harmless inoffensive gases which may be carried out in apparatus of small size.

Another object of the present invention is to provide a process for the conversion of human waste products or the like into harmless inoffensive gases which is efficient and economical.

Other objects and advantages of the present invention will be evident from the following detailed description when read in conjunction with the accompanying drawings.

BRIEF DESCRIPTION OF THE DRAWINGS

FIG. 1 is a diagrammatical view of the combustion vessels of the present invention.

FIG. 2 is a diagrammatical view of another embodiment of combustion vessels of the present invention.

FIG. 3 is a diagrammatical view of one form of the process of the present invention.

DESCRIPTION OF THE PREFERRED EMBODIMENT

Referring now to the drawings, and particularly to FIG. 1, the reference character 10 generally designates the apparatus of the present invention. In the preferred embodiment, the apparatus 10 includes a closed primary combustion vessel 11, containing a suitable molten metal bath 12 in the lower portion thereof. A suitable metal for use in the molten metal bath is lead which is maintained within a preferred temperature range of 620° to 900° F. A line 14 extends into the lower portion of the molten metal bath through which a fine particle slurry comprised of organic waste products and water are introduced into the lower portion of the molten metal bath. Another line 16 extends into the lower portion of the molten metal bath through which air may be introduced into the lower portion of the molten metal bath from outside the vessel 11.

A conduit 18 interconnects the upper portion of the primary combustion vessel 11 and the upper portion of a closed secondary combustion vessel 20. A line 22 extends from the lower portion of the secondary combustion vessel upwardly therethrough to connect with a conduit 24 external to the second combustion vessel. The second combustion vessel 20 is maintained within a preferred temperature range of 1,450° to 1,700° F.

OPERATION OF THE PREFERRED EMBODIMENT

In operation, a fine particle slurry comprised of organic waste products and water is introduced into the lower portion of the molten metal bath 12 through line 14. Upon contact with the molten metal bath, the water in the fine particle slurry is immediately vaporized, forming bubbles in the molten metal bath which travel upwardly therethrough. The bubbles of water vapor carry particles of the organic waste products upward through the molten metal bath, dispersing the fine particles of organic waste products throughout the molten metal bath and exposing them to the elevated temperature thereof. The waste products are predominantly hydrocarbon compounds. At the high temperature of the molten metal bath, the fine particles of waste products are ionized and will be readily oxidized. Depending upon the amount of water combined with the waste products in the slurry, it may be desirable to introduce air into the molten metal bath through the line 16 which will bubble upwardly through the molten metal bath along with the water vapor and fine particles of waste products to provide additional oxygen for the oxidation process taking place in the vessel 11.

Upon contact with the molten metal bath 12, carbon from the waste products is ionized and readily reacts with the oxygen and the water vapor to form hydrogen and other gases, including carbon dioxide. These reactions may be written as follows:

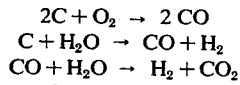

$$2C + O_2 \rightarrow 2CO$$
$$C + H_2O \rightarrow CO + H_2$$
$$CO + H_2O \rightarrow H_2 + CO_2$$

The waste products also contain a considerable amount of sulphur which is readily oxidized at the elevated temperature of the molten bath. Sulphur entering the molten metal bath reacts with the water vapor to form hydrogen and sulphur dioxide. This reaction may be written as follows:

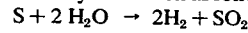

$$S + 2H_2O \rightarrow 2H_2 + SO_2$$

Those solid particles of waste material and salts contained in the water which are not vaporized will float to the top of the molten metal bath 12 to form a layer of slag which is removed from the vessel 11 periodically. It should be noted that the formation of slag on top of the metal bath will not cause a stoppage of the process thereby permitting the scheduling of slag removal at convenient times when the apparatus is idle.

The carbon dioxide, hydrogen, water vapor and other gases formed in the reaction within the molten metal bath 12 pass upwardly through the molten metal bath 12 and out of the primary combustion vessel 11 through conduit 18. The gases pass through conduit 18 to the secondary combustion vessel 20 wherein the gases are heated to further oxidize the other gases and produce harmless inoffensive gases which may then be vented to the atmosphere without polluting effect. These gases are then removed from the secondary combustion vessel through line 22 to conduit 24.

It should be noted that no flow of waste products can be obtained until sufficient heat has been added to the primary combustion vessel 11 to render the metal bath 12 molten. This is a safety feature of the process of the present invention which prevents untreated waste products from passing through the apparatus 10.

Again, depending on the amounts of water combined with the water products, it may be desirable to introduce additional air into the second combustion vessel 20 to provide additional oxygen to complete the oxidation of any partially oxidized gases passing therethrough.

FIG. 3 diagrammatically illustrates the overall process of the present invention. A source of organic waste products 26 supplies waste products to a macerator 28 of conventional design through conduit 30. Water is also supplied to the macerator 28 through the conduit 30 along with the waste products. The water is used to flush the waste products along through the conduit 30 from the source of waste products 26. A fine particle slurry is formed in the macerator 28 from the waste products and the water contained therein. The fine particle slurry is removed from the macerator 28 and pumped through conduit 32 by pump 34 to the apparatus 10. The slurry is processed in the primary combustion vessel 11 and the secondary combustion vessel 20 as described above, and the gases formed during this process are removed from the secondary combustion chamber 20 through conduit 24.

A two-way valve 36 is installed in the conduit 24 and allows the gases being conducted therethrough to be selectively vented to the atmosphere or, alternately, conducted to a condensor 38. The condensor 38 is of conventional design and may be conveniently cooled by water. In the condensor 38, the water vapor is condensed from the gases and the liquid water is conducted through conduit 40 to water reservoir 42. The other gases are also conducted through the conduit 40 to the water reservoir 42 and are vented to the atmosphere through conduit 44.

The water contained in the water reservoir 42 is conducted therefrom through conduit 46 to the source of waste products 26 to be recycled through the process.

The source of waste products 26 may be a flush-type toilet of conventional design or a storage tank connected thereto.

EMBODIMENT OF FIG. 2

FIG. 2 illustrates an alternate embodiment of the apparatus of the present invention which is generally designated by the reference character 10a wherein the secondary combustion vessel 48 contains a molten metal bath 50 of a suitable metal such as lead. When the molten metal bath 50 is lead, it is maintained within a preferred temperature range of 620° to 900° F. The gases conducted from the primary combustion vessel 11 through the conduit 18 are introduced beneath the surface of the molten metal bath 50 through line 52. Depending on the amount of water combined with the waste products, it may be desirable to introduce air beneath the surface of the molten metal bath through line 54. The gases bubble up through the molten metal bath 50 with the gases readily reacting with the water vapor and the oxygen from the air if air is being introduced, to complete the oxidation process of the gases. The gases are then removed from the secondary combustion vessel through conduit 24 and may be processed further as described above and illustrated in FIG. 3.

What is claimed is:

1. A process for converting human organic waste products or the like into harmless inoffensive gases comprising the steps of:
   combining a quantity of water with the waste products so that a slurry is formed comprising water and fine particles of the waste products;
   introducing the slurry beneath the surface of a first body of molten metal so that carbon dioxide, water vapor and other gases are formed; and
   removing the carbon dioxide, water vapor and of the gases from the body of molten metal.

2. A process as defined in claim 1 including the additional steps of simultaneously introducing air beneath the surface of the first body of molten metal to provide additional oxygen to oxidize the fine particles of waste material.

3. A process as defined in claim 1 including the additional steps of;
   introducing the carbon dioxide, water vapor and other gases into a vessel to oxidize the other gases so that additional carbon dioxide, water vapor and other gases are formed therefrom; and
   removing the carbon dioxide, water vapor and other gases from the vessel.

4. A process as defined in claim 3 including the additional step of simultaneously introducing air into he vessel to provide additional oxygen for the oxidation of the other gases.

5. A process as defined in claim 3 including the step of condensing the water vapor removed from the vessel.

6. A process as defined in claim 5 including the step of recycling the condensed water for combination with additional waste products.

7. A process as defined in claim 1 including the steps of:
   introducing the carbon dioxide, water vapor and other gases beneath the surface of a second body of molten metal to form additional carbon dioxide, water vapor and other gases; and
   removing the additional carbon dioxide, water vapor and other gases from the second body of molten metal.

8. A process as defined in claim 7 including the step of simultaneously introducing air beneath the surface of the first body of molten metal to provide oxygen to react with the gases introduced therein.

9. A process as defined in claim 7 including the step of simultaneously introducing air beneath the surface of the second body of molten metal to provide oxygen to react with the other gases introduced therein.

* * * * *